(12) United States Patent
Brown et al.

(10) Patent No.: US 7,752,824 B2
(45) Date of Patent: Jul. 13, 2010

(54) SHRINKAGE-COMPENSATING CONTINUITY SYSTEM

(75) Inventors: David A. Brown, Berkeley, CA (US); Robert D. Lucey, Lafayette, CA (US)

(73) Assignee: MiTek Holdings, Inc., Wilmington, DE (US)

( * ) Notice: Subject to any disclaimer, the term of this patent is extended or adjusted under 35 U.S.C. 154(b) by 1049 days.

(21) Appl. No.: 11/376,713

(22) Filed: Mar. 14, 2006

(65) Prior Publication Data
US 2007/0014630 A1    Jan. 18, 2007

Related U.S. Application Data

(60) Provisional application No. 60/662,115, filed on Mar. 14, 2005.

(51) Int. Cl.
*E04C 5/08* (2006.01)
*E04G 21/00* (2006.01)
*E04G 23/00* (2006.01)

(52) U.S. Cl. ............... 52/745.21; 52/293.3; 52/223.13; 52/223.14; 52/223.4; 52/300; 52/295; 52/566; 52/293.1; 411/383; 411/384

(58) Field of Classification Search ............... 52/293.3, 52/223.14, 92.2, 93.2, 223.13, 223.6, 295, 52/223.4, 300, 566, 745.21, DIG. 11, 712, 52/745.09, 293.1, 481.1; 411/392, 544, 383–384
See application file for complete search history.

(56) References Cited

U.S. PATENT DOCUMENTS 3,695,139 A * 10/1972 Howe .................. 411/432
(Continued)

FOREIGN PATENT DOCUMENTS
WO    WO 2006/055905 A1    5/2006
(Continued)

OTHER PUBLICATIONS

U.S. Appl. No. 60/612,221, filed Sep. 21, 2004; *Self-Tightening Split Nut for Seismic Reinforcement to Accommodate Shrinkage of Wood Members in a Building*, Brown et al., in 11 pages.
(Continued)

*Primary Examiner*—Jeanette Chapman
(74) *Attorney, Agent, or Firm*—Senniger Powers LLP

(57) ABSTRACT

A continuity system for a building is designed to compensate for the downward settling of building elements over time, which occurs due to the shrinkage of wooden building members. The continuity system comprises one or more hold-down assemblies each having a stud-connector secured to a generally vertical stud, a generally vertical rod inserted into an opening of the stud connector, a rod-gripping member in toothed engagement with the rod above the opening, and one or more positioning elements exerting a downward force on the rod-gripping member. The rod has a lower portion secured to a stable building element such as the building's foundation. The opening of the stud-connector defines a frustoconical bearing surface on the upper surface of a portion of the stud-connector, or on a gripper support element in some embodiments. The rod-gripping member includes a plurality of gripping portions each having a lower surface defining a circumferential portion of a frustoconical shape sized and adapted to conform with the frustoconical bearing surface of the stud-connector.

15 Claims, 10 Drawing Sheets

U.S. PATENT DOCUMENTS

| | | |
|---|---|---|
| 3,797,336 A | 3/1974 | Howe |
| 4,271,654 A | 6/1981 | Jungbluth |
| 4,378,187 A | 3/1983 | Fullerton |
| 4,701,065 A | 10/1987 | Orosa |
| 4,812,096 A | 3/1989 | Peterson |
| 4,850,777 A | 7/1989 | Lawrence et al. |
| 4,974,888 A | 12/1990 | Childers |
| 5,048,243 A | 9/1991 | Ward |
| 5,081,811 A | 1/1992 | Sasaki |
| 5,100,275 A | 3/1992 | Schirrmacher |
| 5,324,150 A | 6/1994 | Fullerton |
| 5,347,771 A | 9/1994 | Kobori et al. |
| 5,364,214 A | 11/1994 | Fazekas |
| 5,398,475 A | 3/1995 | Kraus |
| 5,427,488 A | 6/1995 | Fullerton |
| 5,540,530 A | 7/1996 | Fazekas |
| 5,575,129 A | 11/1996 | Goto |
| 5,632,129 A | 5/1997 | Imai et al. |
| 5,664,389 A | 9/1997 | Williams |
| 5,678,375 A | 10/1997 | Juola |
| 5,733,084 A | 3/1998 | Fullerton |
| 5,809,719 A | 9/1998 | Ashton et al. |
| 5,813,181 A | 9/1998 | Ashton et al. |
| 5,819,484 A | 10/1998 | Kar |
| 5,921,042 A | 7/1999 | Ashton et al. |
| 5,987,828 A | 11/1999 | Hardy |
| 5,988,965 A | 11/1999 | Fiorell et al. |
| 5,992,126 A | 11/1999 | Ashton et al. |
| 6,007,284 A | 12/1999 | Taneichi |
| 6,112,486 A | 9/2000 | Ashton et al. |
| 6,155,019 A | 12/2000 | Ashton et al. |
| 6,244,806 B1 * | 6/2001 | Kato ............................ 411/265 |
| 6,361,260 B1 | 3/2002 | Schirrmacher |
| 6,389,767 B1 | 5/2002 | Lucey et al. |
| 6,390,747 B1 | 5/2002 | Commins |
| 6,406,240 B1 | 6/2002 | Potter |
| 6,425,220 B1 | 7/2002 | Ashton et al. |
| 6,546,678 B1 | 4/2003 | Ashton et al. |
| 6,564,519 B2 | 5/2003 | Lucey et al. |
| 6,625,945 B2 | 9/2003 | Commins |
| 6,688,058 B2 * | 2/2004 | Espinosa .................... 52/293.3 |
| 6,826,882 B2 | 12/2004 | Lucey et al. |
| 7,007,432 B2 * | 3/2006 | Commins .................... 52/293.3 |
| 7,171,789 B2 | 2/2007 | Lucey et al. |
| 2005/0108986 A1 | 5/2005 | Cloyd et al. |
| 2007/0137125 A1 | 6/2007 | Lucey et al. |
| 2007/0286702 A1 | 12/2007 | Smith |

FOREIGN PATENT DOCUMENTS

| | | |
|---|---|---|
| WO | WO 2008/016543 A2 | 2/2008 |

OTHER PUBLICATIONS

Printout of contents of compact disc from Ronald A. Smith & Associates Inc. to Zone Four, in 128 pages.

* cited by examiner

SHRINKAGE-COMPENSATING CONTINUITY SYSTEM

RELATED APPLICATIONS

This application claims the benefit under 35 U.S.C. §119(e) of U.S. Provisional Application No. 60/662,115, filed Mar. 14, 2005, the entirety of which is hereby incorporated by reference herein.

BACKGROUND OF THE INVENTION

1. Field of the Invention

The present invention relates generally to building construction and reinforcement, and specifically to a continuity system that compensates for the downward settling of buildings caused by shrinkage of wooden members.

2. Description of the Related Art

A continuity system is a secondary support system that ties studs or other building elements together and resists lateral forces from events such as earthquakes or strong winds. Lateral forces tend to produce moment loads in the building, which can pull the building elements upward with respect to the building foundation. A continuity system resists such upward movement of the building elements. A continuity system generally comprises a plurality of spaced continuity lines (e.g., vertical rods) that provide a discrete structural mechanism or load path framework for the transfer of loads through the building to the structural elements that are intended to resist such forces, such as roof or floor diaphragms. For example, the presence of a continuity system might prevent a concrete wall panel from experiencing loads and/or moments that might damage the wall.

A known continuity system is described in U.S. Pat. No. 5,813,181 ("the '181 patent"), the entire disclosure of which is hereby incorporated herein by reference. The '181 patent describes a system in which a "continuity tie" or "hold-down" connection device (such as a Continuity Tie available from Trussed, Inc. of Perris, Calif.) comprises a member that defines a channel for receiving a threaded rod. In one application, the continuity tie is secured to a lateral surface of a vertical wooden stud of a building, and the rod extends through the continuity tie parallel to the stud. The rod may extend through a number of different continuity ties within one or several floors of the building. A lower portion of the rod is secured to a structural element below the stud (e.g., a floor or foundation). In one arrangement, the continuity tie has a horizontal end plate with an opening through which the rod extends, and a nut is threaded onto the rod just above the end plate. Since the rod and nut are substantially vertically fixed with respect to the structural element below, the nut and rod resist upward movement of the wooden stud and associated building elements relative to the structural building element, which is often caused by strong lateral forces on the building structure. This particular continuity system typically involves a plurality of continuity ties and rods secured to vertical studs throughout the building. Another known continuity system is described in U.S. Pat. No. 6,389,767 ("the '767 patent"), the entire disclosure of which is also hereby incorporated herein by reference, which describes a continuity system as part of a shear wall construction.

One problem with these particular continuity systems is that they do not accommodate shrinkage of the wooden members of the building. Wooden members often shrink over time due to the loss of moisture. In a typical building, there is often horizontal wooden flooring or other wooden members below a wall. As such horizontal wooden members shrink over time, the wall above moves down. The wall of course includes the vertical wooden members to which the continuity ties are secured, as well as the continuity ties that are bolted to such vertical wooden members. However, since the threaded rods are fixed with respect to, e.g., the building foundation, the continuity ties move downward with respect to the rods, such that the nuts no longer bear against the end plates of the continuity ties. This introduces some "slop" in the continuity system, which permits the wooden studs and associated building elements to move upward relative to the rods. Such slop often results in structural damage to the building when the building elements move upward, for example during an earthquake.

SUMMARY OF THE INVENTION

Accordingly, it is a principal advantage of the present invention to overcome some or all of these limitations and to provide a hold-down assembly that is self-adjusting to provide substantially continuous resistance to upward movement of building elements.

In one aspect, the present invention provides a hold-down assembly comprising a generally vertical stud, a generally vertical rod, a stud-connector, a rod-gripper, and a gripper-positioning element. The stud forms part of a building structure. The rod has a lower end secured to a stable building element (e.g., building foundation) configured to have a substantially constant vertical position during downward settling of elements of the building structure. The stud-connector is secured with respect to the stud at a position displaced from a lower end of the stud. The stud-connector has an opening within which the rod is received, the opening defining a frustoconical bearing surface on an upper surface of a portion of the stud-connector. The rod-gripper comprises a plurality of separate gripping portions generally surrounding the rod above the frustoconical bearing surface of the stud-connector. Each of the gripping portions has a rod-engagement surface and a lower surface. Each of the rod-engagement surfaces has teeth configured to engage circumferential teeth of a circumferential portion of the rod. Each of the lower surfaces of the gripping portions is sized and adapted to bear against a circumferential portion of the frustoconical bearing surface of the stud-connector.

The gripper-positioning element exerts a downward force onto the rod-gripper. Downward movement of the stud and stud-connector with respect to the rod causes the downward force exerted by the gripper-positioning element onto the rod-gripper to result in disengagement of the teeth of the gripping portions from the teeth of the rod so that the rod-gripper moves downward until the lower surfaces of one or more of the gripping portions bears against the frustoconical bearing surface of the stud-connector. The bearing of the lower surfaces of the one or more gripping portions against the frustoconical bearing surface of the stud-connector causes the teeth of the gripping portions to reengage the teeth of the rod.

In another aspect, the present invention provides a hold-down kit for a building, comprising a rod, a stud-connector, and a rod-gripper. The rod has a lower end configured to be secured to a stable building element that has a substantially constant vertical position during downward settling of elements of the building. The stud-connector is configured to be secured with respect to a generally vertical stud at a position displaced from a lower end of the stud. The stud-connector has an opening configured to receive the rod. The opening defines a frustoconical bearing surface on an upper surface of a portion of the plate. The rod-gripper comprises a plurality of gripping portions each having a rod-engagement surface and a lower surface. Each of the rod-engagement surfaces has teeth configured to engage circumferential teeth of a circumferential portion of the rod. Each of the lower surfaces of the gripping portions is sized and adapted to bear against a circumferential portion of the frustoconical bearing surface of the stud-connector. The gripping portions are adapted to generally surround the rod with the teeth of the rod-engagement surfaces engaging the teeth of the rod so that the gripping portions, when radially compressed together, are substantially prevented from moving vertically with respect to the rod.

In still another aspect, the present invention provides a hold-down kit comprising a nut-supporting element and a segmented nut. The nut-supporting element is adapted to be secured to a stud-connector that is secured with respect to a generally vertical stud at a position displaced from a lower end of the stud. The nut-supporting element has an opening configured to receive a generally vertical threaded rod. The opening defines a frustoconical bearing surface on an upper surface of the nut-supporting element. The segmented nut comprises a plurality of nut portions each having a rod-engagement surface and a lower surface. Each of the rod-engagement surfaces has threads configured to engage threads of a circumferential portion of the rod. Each of the lower surfaces of the nut portions is sized and adapted to bear against a circumferential portion of the frustoconical bearing surface of the nut-supporting element. The nut portions are adapted to generally surround the rod with the threads of the rod-engagement surfaces engaging the threads of the rod so that the nut portions, when radially compressed together, are substantially prevented from moving vertically with respect to the rod.

In yet another aspect, the present invention provides a method of holding down a building construction. A generally vertical rod is provided generally parallel to a generally vertical stud of a building structure. A lower portion of the rod is secured to a stable building element configured to have a substantially constant vertical position during downward settling of elements of the building structure. A stud-connector is provided, having an opening configured to receive the rod. The stud-connector is engaged with the rod so that the rod is received within the opening of the stud-connector. The stud-connector is secured with respect to the stud. A rod-gripping member is engaged onto the rod closely above the opening of the stud-connector. The rod-gripping member comprises a plurality of gripping portions generally surrounding the rod. Each of the gripping portions has a rod-engagement surface with teeth configured to engage circumferential teeth of a circumferential portion of the rod. The gripping portions are sized so that when they are compressed radially inward into toothed engagement with the rod the rod-gripping member and rod have a horizontal cross section that is too large to pass downward through the opening of the stud-connector. Finally, the method includes reacting to a downward movement of the stud and stud-connector with respect to the rod and rod-gripping member by pushing the rod-gripping member downward with respect to the rod until the rod-gripping member is in toothed engagement with the rod closely above the opening of the stud-connector.

In yet another aspect, the present invention provides a hold-down assembly comprising a first generally vertical stud, a generally vertical rod, a stud-connector, a gripper support element, a rod-gripper, and a first gripper-positioning element. The first generally vertical stud forms a part of a building structure. The generally vertical rod has a lower end secured to a stable building element configured to have a substantially constant vertical position during downward settling of elements of the building structure. The stud-connector is secured with respect to the stud at a position displaced from a lower end of the stud, the stud-connector having an opening within which the rod is received. The gripper support element is positioned above the stud connector and has an opening within which the rod is received, the opening defining a frustoconical bearing surface of the gripper support element. The rod-gripper comprises a plurality of separate gripping portions generally surrounding the rod above the frustoconical bearing surface of the gripper support element. Each of the gripping portions has a rod-engagement surface and a lower surface. Each of the rod-engagement surfaces has teeth configured to engage circumferential teeth of a circumferential portion of the rod, and each of the lower surfaces of the gripping portions is sized and adapted to bear against a circumferential portion of the frustoconical bearing surface of the gripper support element. The first gripper-positioning element is configured to move downward relative to the rod during said downward settling of elements of the building structure. The first gripper-positioning element is also adapted to exert a downward force onto the rod-gripper as the first gripper-positioning element moves downward. Downward movement of the stud, stud-connector, and gripper support element with respect to the rod causes the downward force exerted by the gripper-positioning element onto the rod-gripper to result in disengagement of the teeth of the gripping portions from the teeth of the rod so that the rod-gripper moves downward with respect to the rod. Upward movement of the stud, stud-connector, and gripper support element relative to the rod causes the frustoconical bearing surface to compress the gripping portions radially inward into toothed engagement with the teeth of the rod.

In another aspect, a hold-down assembly comprises a generally horizontal plate forming part of a building structure, a generally vertical rod, a plate-connector, a gripper support element, a rod-gripper, and a gripper-positioning element. The generally vertical rod has a lower end secured to a stable building element configured to have a substantially constant vertical position during downward settling of elements of the building structure. The plate-connector rests above an upper surface of the plate. The plate-connector also has an opening within which the rod is received. The gripper support element has an opening within which the rod is received, the opening defining a frustoconical bearing surface of the gripper support element. The rod-gripper comprises a plurality of separate gripping portions generally surrounding the rod above the frustoconical bearing surface of the gripper support element. Each of the gripping portions has a rod-engagement surface and a lower surface. Each of the rod-engagement surfaces has teeth configured to engage circumferential teeth of a circumferential portion of the rod. Each of the lower surfaces of the gripping portions is sized and adapted to bear against a circumferential portion of the frustoconical bearing surface of the gripper support element. The gripper-positioning element is configured to move downward relative to the rod during said downward settling of elements of the building structure. The gripper-positioning element is adapted to exert a downward force onto the rod-gripper as the gripper-positioning element moves downward. Downward movement of the plate, plate-connector, and gripper support element with respect to the rod causes the downward force exerted by the gripper-positioning element onto the rod-gripper to result in disengagement of the teeth of the gripping portions from the teeth of the rod so that the rod-gripper moves downward with respect to the rod. Upward movement of the plate, plate-connector, and gripper support element with respect to the rod causes the frustoconical bearing surface to compress the gripping portions radially inward into toothed engagement with the teeth of the rod.

In yet another aspect, the present invention provides a method of holding down a building construction. A generally vertical rod is provided generally parallel to a first generally vertical stud of a building structure. A lower portion of the rod is secured to a stable building element configured to have a substantially constant vertical position during downward settling of elements of the building structure. A stud-connector is provided, having an opening configured to receive the rod. The stud-connector is engaged with the rod so that the rod is received within the opening of the stud-connector. The stud-connector is then secured with respect to the first stud. A gripper support element is provided having an opening configured to receive the rod. The gripper support element is engaged with the rod so that the rod is received within the opening of the gripper support element. A rod-gripping member is engaged onto the rod closely above the opening of the gripper support element, the rod-gripping member comprising a plurality of gripping portions generally surrounding the rod. Each of the gripping portions has a rod-engagement surface with teeth configured to engage circumferential teeth of a circumferential portion of the rod. The gripping portions are sized so that when they are compressed radially inward into toothed engagement with the rod, the rod-gripping member and rod have a horizontal cross section that is too large to pass downward through the opening of the gripper support element. Finally, the method includes reacting to an upward movement of the stud, stud-connector, and gripper support element with respect to the rod and rod-gripping member by compressing the gripping portions radially inward into toothed engagement with the rod closely above the opening of the gripper support element, so that the rod-gripping member substantially impedes the upward movement of the stud, stud-connector, and gripper support element relative to the rod.

In yet another aspect, the present invention provides a method of holding down a building construction. A generally vertical rod is provided generally perpendicular to a generally horizontal plate of a building structure. A lower portion of the rod is secured to a stable building element configured to have a substantially constant vertical position during downward settling of elements of the building structure. A plate-connector is provided having an opening configured to receive the rod. The plate-connector is engaged with the rod so that the rod is received within the opening of the plate-connector. The plate-connector is rested above an upper surface of the plate. A gripper support element is provided having an opening configured to receive the rod. The gripper support element is engaged with the rod so that the rod is received within the opening of the gripper support element. A rod-gripping member is engaged onto the rod closely above the opening of the gripper support element. The rod-gripping member comprises a plurality of gripping portions generally surrounding the rod. Each of the gripping portions has a rod-engagement surface with teeth configured to engage circumferential teeth of a circumferential portion of the rod. The gripping portions are sized so that when they are compressed radially inward into toothed engagement with the rod the rod-gripping member and rod have a horizontal cross section that is too large to pass downward through the opening of the gripper support element. Finally, the method includes reacting to an upward movement of the plate, plate-connector, and gripper support element with respect to the rod and rod-gripping member by compressing the gripping portions radially inward into toothed engagement with the rod closely above the opening of the gripper support element.

In yet another aspect, a hold-down assembly comprises a load-bearing member of a structure, a rod, a connector, a gripper support element, a rod-gripper, and a gripper positioning element. The rod extends generally along and is spaced from the load-bearing member. The rod also includes an end secured with respect to a main structural member of the structure. The connector is secured with respect to the load-bearing member. The connector also includes an opening within which the rod is received. The gripper support element has an opening within which the rod is received. The opening of the gripper support element defines a frustoconical bearing surface of the gripper support element. The gripper support element has a first side facing a first direction, and a second side facing an opposite second direction. The first side faces toward the main structural member of the structure. The connector is positioned on the first side of the gripper support element. The rod-gripper comprises a plurality of separate gripping portions generally surrounding the rod on the second side of the gripper support element closely spaced from the frustoconical bearing surface. Each of the gripping portions has a rod-engagement surface and a bearing surface. Each of the rod-engagement surfaces has teeth configured to engage circumferential teeth of a circumferential portion of the rod. Each of the bearing surfaces of the gripping portions is sized and adapted to bear against a circumferential portion of the frustoconical bearing surface of the gripper support element. The gripper-positioning element is positioned on the second side of the gripper support element so that the rod-gripper is between the gripper-positioning element and the frustoconical bearing surface of the gripper support element. The gripper-positioning element is configured to move along the rod in the first direction during movement of the load-bearing member in the first direction relative to the main structural member. The gripper-positioning element is also adapted to exert a force onto the rod-gripper in the first direction as the gripper-positioning element moves in the first direction relative to the rod. Movement of the load-bearing member, connector, gripper support element, and gripper-positioning element in the first direction with respect to the rod causes the force exerted by the gripper-positioning element onto the rod-gripper to result in disengagement of the teeth of the gripping portions from the teeth of the rod so that the rod-gripper moves in the first direction along the rod. Furthermore, movement of the load-bearing member, connector, gripper-positioning element, and gripper support element in the second direction with respect to the rod causes the frustoconical bearing surface to compress the gripping portions into toothed engagement with the teeth of the rod.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENT

Figure 1:
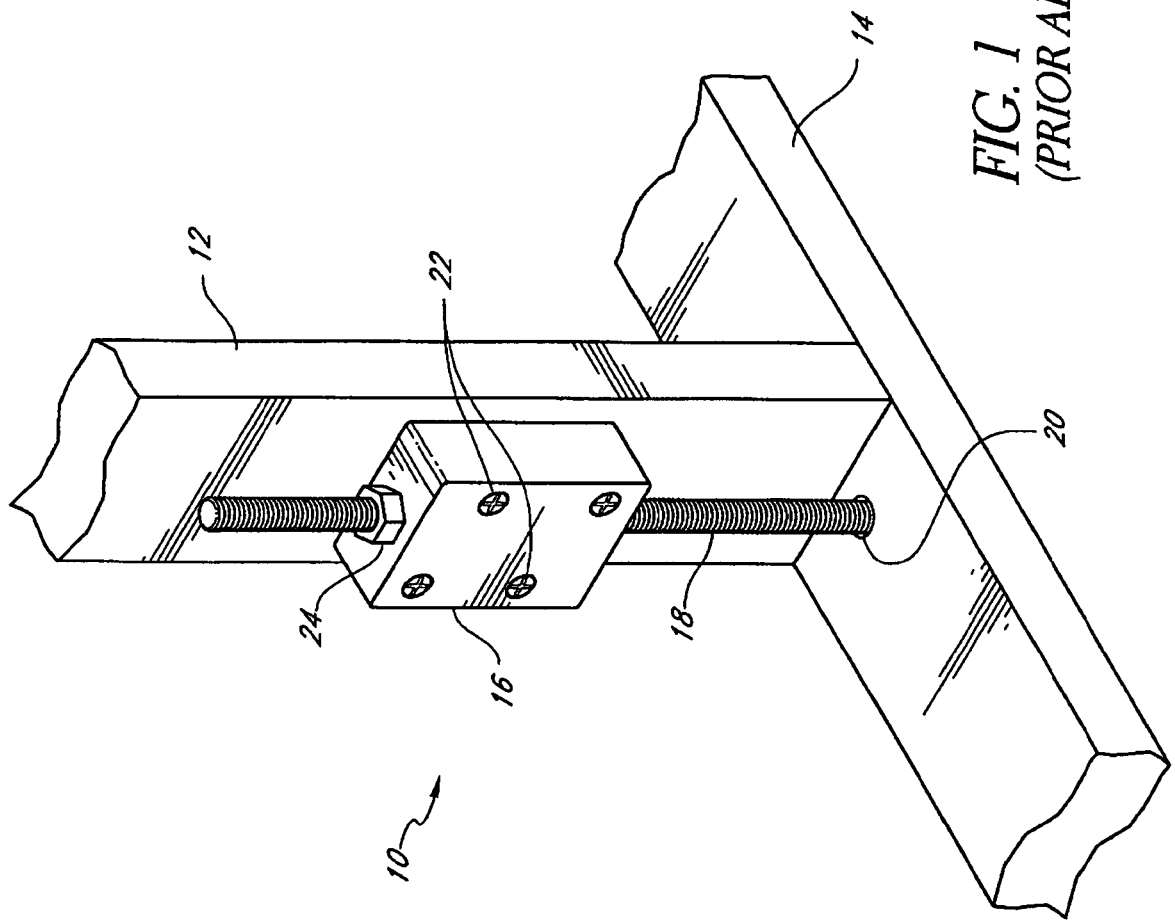
FIG. 1 is a top perspective view of a conventional hold-down assembly.

FIG. 1 shows a hold-down assembly 10 for holding down a generally vertical stud 12 with respect to a stable structural element below, such as a building foundation. The illustrated stud 12 has a lower end bearing against a generally horizontal beam or chord 14. The hold-down assembly 10 comprises a stud-connector 16 and a generally vertical rod 18. The stud-connector 16 is secured to the stud 12 and engaged with the rod 18 in a manner that resists upward movement of the stud-connector 16 with respect to the rod 18. The rod 18 extends downward through a hole 20 in the chord 14, a lower portion of the rod being secured to a building element whose vertical position remains substantially constant as various elements of the building (e.g., the stud 12) "settle" downward due to the shrinkage of wooden members. Typically, the lower portion of the rod 18 is secured to the building's foundation or to another portion of the building's continuity system. In the illustrated hold-down assembly, the stud-connector 16 comprises a continuity tie as described in the '181 patent, secured to a lateral surface of the stud 12 by a plurality of bolts extending through bolt holes 22. In the illustrated hold-down assembly 10, the rod 18 is threaded and engaged with a nut 24 bearing against an upper surface of the stud-connector 16. The building may include a plurality of hold-down assemblies 10 secured to vertical studs throughout the building. When the building experiences a lateral load, the hold-down assemblies 10 prevent the building elements, such as the stud 12, from moving upward relative to the stable building element to which the rods 18 are secured (e.g., the building foundation).

Figure 2A:
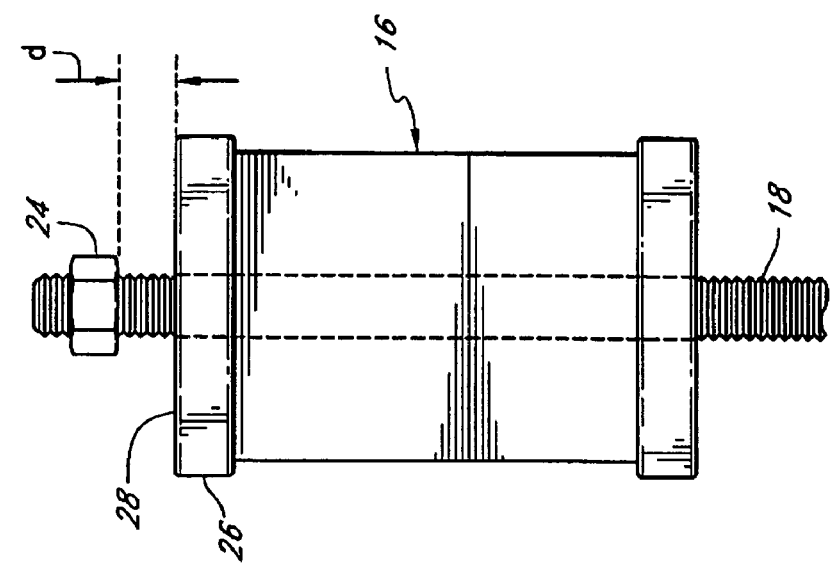
FIG. 2A is a side view of the conventional hold-down assembly of FIG. 1.
Figure 2B:
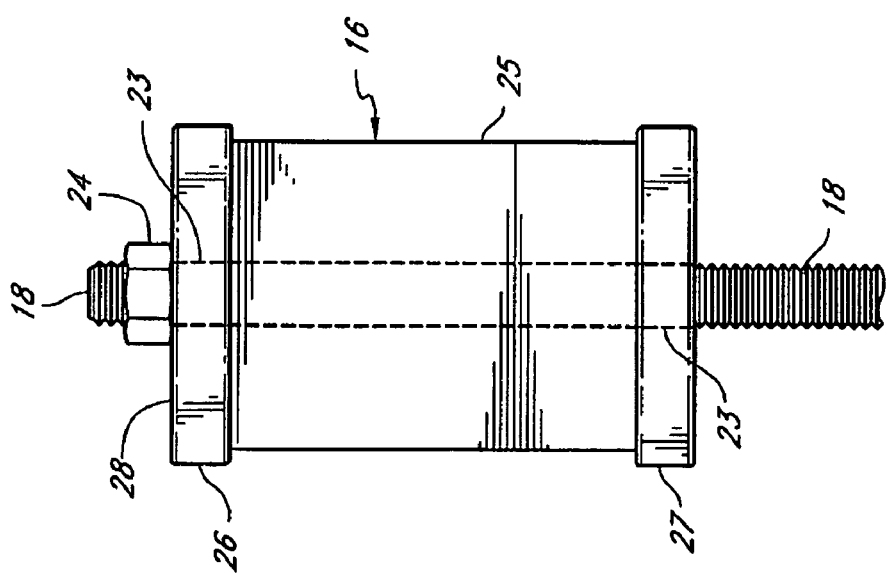
FIG. 2B is a side view of the conventional hold-down assembly of FIG. 1 after the stud-connector has moved downward with respect to the rod.

While this hold-down assembly 10 has proven to be very useful for a variety of reasons, its effectiveness becomes reduced over time due to the "settling" or downward movement of the building elements, including the stud 12 and chord 14, due to shrinkage of wooden members of the building. This is illustrated in FIGS. 2A and 2B. With reference to FIG. 2A, the stud-connector 16 comprises a body 25 with an upper plate 26 and lower plate 27. The body 25 defines a channel through which the threaded rod 18 extends. Likewise, the plates 26 and 27 have holes 23 through which the rod 18 extends. The nut 24 is threadably engaged with the rod 18 closely above a top surface 28 of the upper plate 26. If lateral forces on the building, such as an earthquake or strong winds, cause the stud-connector 16 to move upward relative to the rod 18, the nut 24 impedes the upper plate 26 and thereby resists such upward movement. However, over time various wooden members of the building may shrink, causing the building to settle downward. This downward settling causes the stud-connector 16 to move downward relative to the rod 18, as shown in FIG. 2B. However, since the nut 24 remains in its original vertical position, a gap d is formed between the nut 24 and the top surface 28 of the upper plate 26. This gap d introduces "slop" in the continuity system, which can permit an undesirably large degree of upward movement of the stud 12 (FIG. 1) and associated building elements. This upward movement can result in damage to the building structure.

Figure 3:
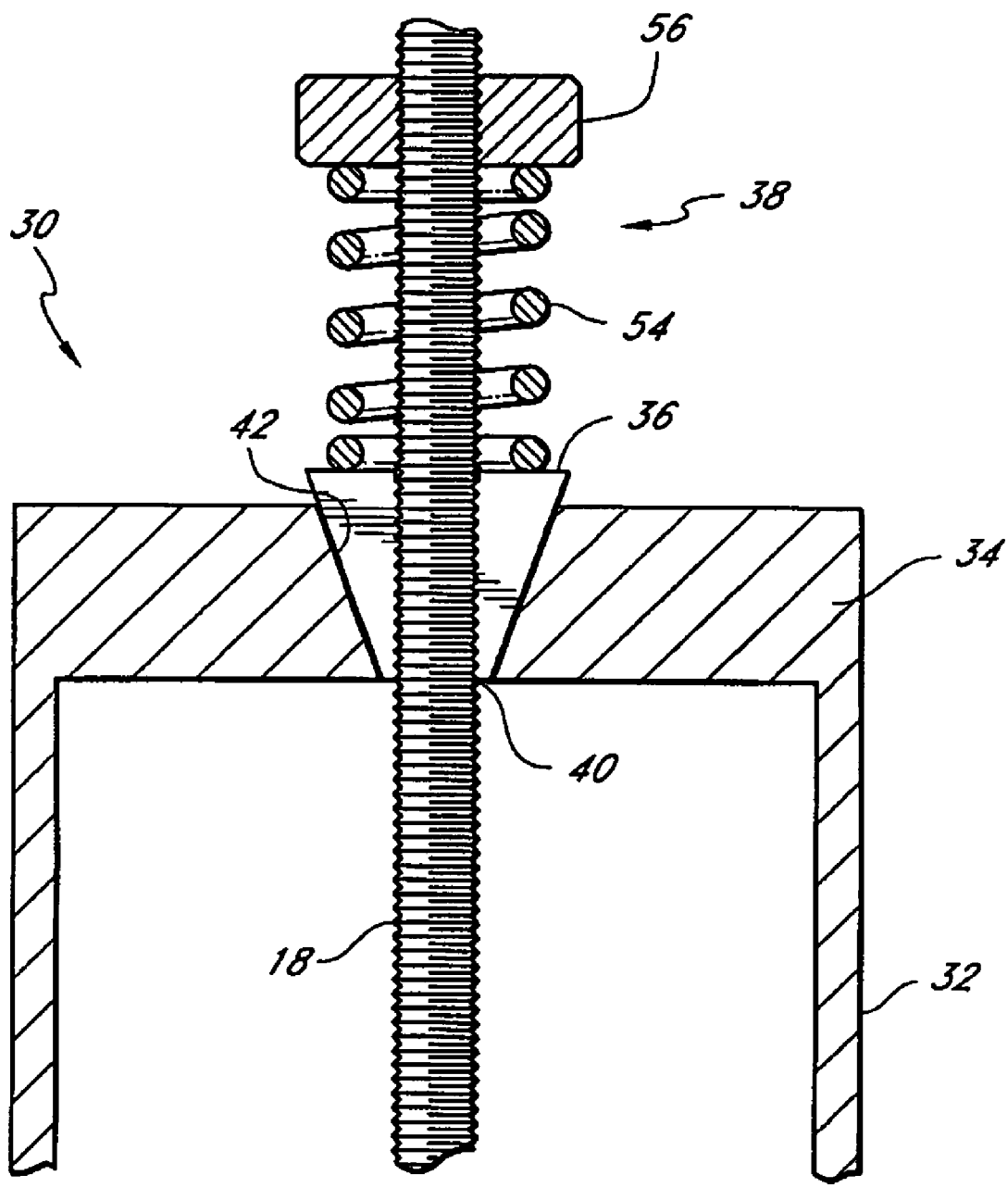
FIG. 3 is a vertical sectional view of an upper portion of a hold-down assembly according to one embodiment of the present invention.

FIG. 3 shows an upper portion of a hold-down assembly 30 according to one embodiment of the present invention. The hold-down assembly 30 comprises a stud-connector 32, a rod-gripping member or "rod-gripper" 36 (illustrated herein as a segmented nut), a gripper-positioning element 38 (illustrated herein as a nut-positioning element), and the threaded rod 18 as described above. The stud-connector 32 is configured to be secured to a generally vertical stud, such as the stud 12 shown in FIG. 1. Typically, the stud connector 32 is secured to a lateral surface of the stud 12, somewhat displaced from the stud's 12 lower end. The stud-connector 32 has a gripper-supporting portion 34 (illustrated herein as a nut-supporting portion) with an opening 40 within which the rod 18 is received. The opening 40 defines a frustoconical bearing surface 42 on an upper surface of the gripper-supporting portion 34. In the illustrated embodiment, the nut-supporting portion 34 comprises an end plate of the stud-connector 32. However, the nut-supporting portion 34 can be provided in other locations on the stud-connector 32, including anywhere between and displaced from its ends.

Figure 4:
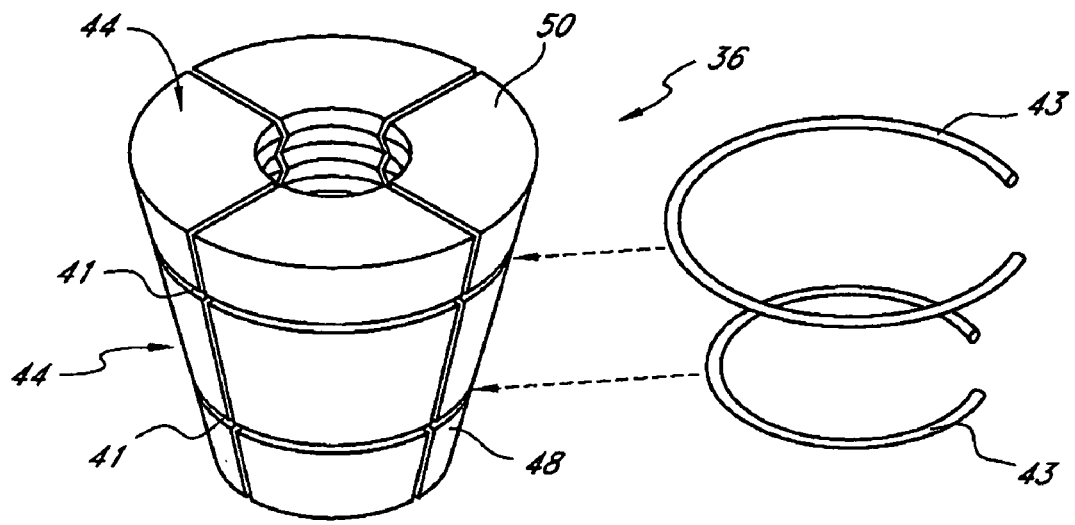
FIG. 4 is a perspective view of the segmented nut of the hold-down assembly of FIG. 3.
Figure 5:
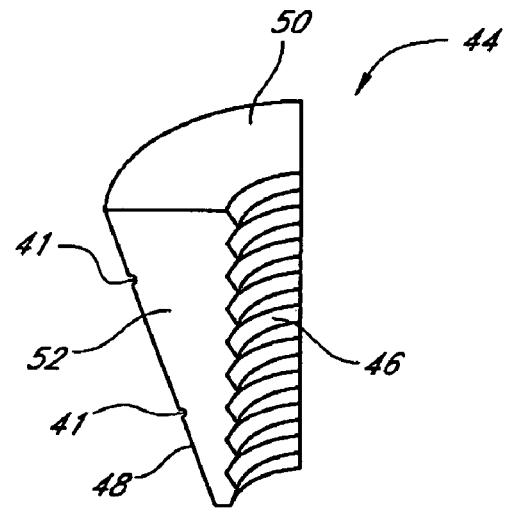
FIG. 5 is a perspective view of one portion of the segmented nut of FIG. 4.
Figure 6:
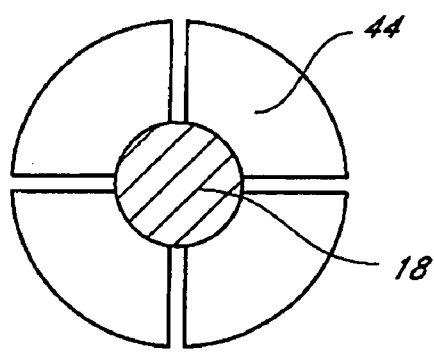
FIG. 6 is a top view of the segmented nut of FIG. 4 shown engaged with a threaded rod.

The rod-gripper 36 preferably comprises a plurality of separate gripping portions that have teeth sized and shaped to engage circumferential teeth of the rod 18. A preferred embodiment of a rod-gripper 36 is shown in greater detail in FIGS. 4-6. The illustrated segmented nut 36 comprises a plurality of nut portions 44 that generally surround the rod 18 above the frustoconical bearing surface 42 of the stud-connector 32. In the illustrated embodiment, each of the nut portions 44 has a rod-engagement surface 46, a lower surface 48, an upper surface 50, and two side surfaces 52. Each or at least one of the rod-engagement surfaces 46 has threads configured to engage threads of a circumferential portion of the rod 18. Each of the lower surfaces 48 is preferably sized and adapted to bear against a circumferential portion of the frustoconical bearing surface 42 of the stud-connector 32. Preferably, each of the lower surfaces 48 is sized and shaped to substantially conform with a circumferential portion of the frustoconical bearing surface 42. The lower surfaces 48 may also include one or more generally horizontal grooves 41 that circumscribe the lower surfaces 48 of the nut portions 44. Each groove 41 is configured to accommodate a flexible, preferably elastic band element 43. The band element 43 holds together the nut portions 44 and compresses the nut portions 44 radially inwardly toward the rod 18. The band element 43 is configured to expand radially to accommodate the disengagement of the nut portions 44 from the threads of the rod 18, as described elsewhere herein. Preferably, the band element 43 is a C-shaped metal spring that has a low spring rate, or alternatively, a rubber band. While the illustrated segmented nut 36 includes four nut portions 44, it will be understood that it may include two, three, four, or even more nut portions 44. With reference to FIG. 6, the nut portions 44 are preferably sized so that when the threads of their nut engagement surfaces 46 are in engagement with the threads of the rod 18 it is not possible for each one of the side surfaces 52 to be in contact with the confronting side surface 52 of the adjacent nut portion 44. This permits the segmented nut 36 to grip onto the rod 18 when the nut portions 44 are compressed radially inward toward the rod 18. When the nut portions 44 are radially compressed toward the rod 18, the nut portions 44 are substantially prevented from moving vertically relative to the rod 18. The illustrated nut portions 44 and rod 18 are sized so that when the nut portions 44 are compressed radially inward into threaded engagement with the rod 18, the rod 18 and segmented nut 36 have a horizontal cross section that is too large to pass downward through the opening 40 of the stud-connector 32. In the illustrated embodiment, (1) the opening 40 is substantially circular, (2) the horizontal cross-section of the rod 18 and nut portions 44 is generally circular throughout the height of the segmented nut 36, and (3) the diameter of such horizontal cross-section is larger than the diameter of the opening 40, at least at the top of the nut 36. In the illustrated embodiment, the rod 18 is threaded. However, skilled artisans will readily understand that the rod 18 need not be threaded. In a different embodiment, the rod 18 includes circumferential teeth comprising spaced rings or like structure along some or all of the length of the rod. In this alternative embodiment, the circumferential teeth do not form a thread along the rod 18, and the gripping portions 44 include teeth that are sized and shaped to engage and preferably conform to the circumferential teeth of the rod. It will also be understood from the teachings herein that the rod 18 can have any of a variety of cross-sectional shapes (including non-circular shapes), giving due consideration to the goal of providing gripping portions 44 that are capable of gripping onto the rod. The description above and below is in the context of a threaded circular rod 18, which provides several advantages over other types of rods (e.g., wide availability and use, ease of retrofitting, etc.). However, it will be understood that the present invention is not limited to a threaded circular rod.

As used herein, "teeth" encompasses the teeth of a single thread of a threaded rod, as well as other types of teeth (e.g., spaced rings formed on a rod). "Toothed engagement" refers to the engagement of teeth with one another. "Circumferential teeth" refers to teeth or teeth portions that extend generally along and preferably throughout the circumference of a body, such as the teeth of a single thread or the teeth formed by spaced rings on a rod.

With continued reference to FIG. 3, the nut-positioning element 38 is configured to exert a downward force onto the top surfaces 50 of the nut portions 44 of the segmented nut 36. When the lower surfaces 48 of the nut portions 44 bear against the frustoconical bearing surface 42 of the stud-connector 32, the downward force exerted by the nut-positioning element 38 causes the surface 42 to exert reaction forces whose radial components push the nut portions 44 radially inward into the rod 18. This causes the nut portions 44 to grip onto the threads of the rod 18, which resists vertical movement of the segmented nut 36 with respect to the rod. Over time, the stud (e.g., stud 12, FIG. 1) and stud-connector 32 move downward with respect to the rod 18 due to the shrinkage of wooden members of the building. The nut-positioning element 38 acts to move the segmented nut 36 downward with the stud-connector 32. As the frustoconical bearing surface 42 moves away from the lower surfaces 48 of the nut portions 44, the downward force of the nut-positioning element 38 causes the nut portions 44 to move radially outward to disengage from the threads of the rod 18. When the nut portions 44 are disengaged from the threads of the rod 18, the nut-positioning element 38 pushes the nut portions downward until the lower surfaces 48 of the nut portions bear against the frustoconical bearing surface 42. With the segmented nut 36 again forced downward against the bearing surface 42, the surface 42 exerts a reaction force that compresses the segmented nut 36 into threaded engagement with the rod 18.

Thus it can be seen that upward movement of the stud (e.g., stud 12 of FIG. 1) and stud-connector 32 with respect to the rod 18 causes the frustoconical bearing surface 42 of the stud-connector 32 to exert radially inward compression forces onto the nut portions 44, which in turn causes the threads of the nut portions 44 to engage the threads of the rod 18. As a consequence, the segmented nut 36 and stud-connector 32 are substantially prevented from moving upward relative to the rod 18. It can also be seen that downward movement of the stud 12 and stud-connector 32 with respect to the rod 18 causes the downward force of the nut-positioning element 38 onto the segmented nut 36 to result in disengagement of the threads of the nut portions 44 from the threads of the rod 18. This in turn causes the segmented nut 36 to move downward until the lower surfaces 48 of the nut portions 44 bear against the frustoconical bearing surface 42 of the stud-connector 32. The bearing of the lower surfaces 48 of the nut portions 44 against the frustoconical bearing surface 42 of the stud-connector 32 causes the threads of the nut portions 44 to reengage the threads of the rod 18.

With reference again to FIG. 3, the nut-positioning element 38 preferably comprises a compressed spring 54 having a bottom end bearing against the segmented nut 36 and a top end engaged with the rod 18 so that the top end of the spring 54 is prevented from moving upward with respect to the rod 18. In the illustrated embodiment, the spring 54 comprises a coil spring coiled around the rod 18, and a spring-biasing nut 56 is threaded onto the rod 18 above the segmented nut 36. The spring 54 is interposed between the two nuts 36 and 56. The top and bottom ends of the spring 54 preferably bear against the nut 56 and the nut 36, respectively. The spring 54 is preferably loaded in a sufficiently compressed state so as to exert a sufficient downward force onto the segmented nut 36 even after the full extent of the expected downward settlement of the stud-connector 32. In other words, since the spring force decreases as the spring 54 expands, the spring 54 is preferably compressed sufficiently so that, even after the stud-connector 32 moves down as far as expected, the downward force of the spring 54 will still be sufficient to push the segmented nut 36 into the frustoconical bearing surface 42. It will be understood that, at the time that the spring 54 is loaded, the downward force of the spring 54 can be adjusted by rotating the spring-biasing nut 56.

It will be understood that the hold-down assembly 30 of FIG. 3 can be provided in the form of a kit of unassembled parts. For example, the kit may comprise any combination of two or more of the rod 18, stud-connector 32, segmented nut 36, spring 54, and spring-biasing nut 56.

A method of assembling the illustrated hold-down assembly 30 is now described. The rod 18 is positioned generally parallel to a generally vertical stud (e.g., stud 12 of FIG. 1) of the building structure. The lower portion of the rod 18 is secured to a stable building element (e.g., the building foundation or another portion of the continuity system) whose vertical position remains substantially constant during downward movement or settling of the stud 12, as occurs when wooden members of the building shrink over time. A stud-connector 32 (FIG. 3) is engaged with the rod 18 so that the rod 18 is received within the opening 40 of the stud-connector. The stud-connector 32 is secured to the stud 12, preferably to a lateral surface of the stud 12 via bolts or the like, and also preferably somewhat displaced from a lower end of the stud 12. The segmented nut 36 is engaged (preferably threadingly engaged) onto the rod 18 closely above the opening 40 of the stud-connector 32. The spring-biasing nut 56 is threadingly engaged onto the rod 18. The coil spring 54 is slid onto the rod 18 and positioned underneath the nut 56. With the top end of the spring 54 bearing against the nut 56, the bottom end of the spring 54 bearing against the segmented nut 36, the segmented nut 36 positioned closely above or bearing against the frustoconical bearing surface 42, and the stud-connector 32 secured to the stud 12, the nut 56 is rotated to adjust the compression force of the spring 54 to a desired level.

The aforementioned assembly steps can be performed in a variety of different sequences other than as set forth above. While the rod 18 is ordinarily secured to the stable building element (e.g., building foundation) prior to engaging the rod 18 with the stud-connector 32, these steps may be reversed in order. While the stud-connector 32 is ordinarily engaged with the rod 18 before the stud-connector 32 is secured to the stud 12, the order of these steps can also be reversed. The segmented nut 36 is preferably engaged onto the rod 18 after the rod 18 and stud-connector 32 are engaged with one another, and also preferably after the stud-connector 32 is secured to the stud 12. However, these steps can be performed in different sequences. For example, the nut portions 44 can be clamped onto the rod 18 (e.g., via a clamp, rubber bands, or the like) prior to inserting the rod 18 into the opening 40. Also, the nut portions 44 can be engaged with the rod 18 after the rod 18 is inserted into the opening 40, but before the stud-connector 32 is secured to the stud 12. The nut-positioning element 38 can be assembled onto the assembly 30 either before or after (1) the segmented nut 36 is engaged with the rod 18, (2) the rod 18 is engaged with the stud-connector 32, or (3) the stud-connector 32 is secured to the stud 12. Skilled artisans will understand that the aforementioned assembly steps may be performed in a variety of different sequences, giving due consideration to the goal of constructing the assembly 30 shown in FIG. 3.

Thus, it can be seen that the present invention involves a method of reacting to lateral forces on a building structure. With reference to FIG. 3, such forces tend to cause the stud-connector 32 and stud to which it is secured (e.g., stud 12 of FIG. 1) to move upward with respect to the rod 18 and segmented nut 36. Should this occur, the inventive method involves compressing the nut portions 44 radially inward toward the rod 18 to cause the segmented nut 36 to grip onto the threads of the rod and thereby substantially prevent the segmented nut, stud-connector 32, and stud from moving upward with respect to the rod.

The present invention also involves a method of compensating for downward settling of the building elements of a building structure. With reference to FIG. 3, this causes the stud-connector 32 and stud to which it is secured to move downward with respect to the rod 18 and segmented nut 36. To compensate for this, the inventive method involves pushing the segmented nut 36 downward with respect to the rod 18 until the segmented nut is in threaded engagement with the rod closely above or in contact with the opening 40 of the stud-connector 32. In the illustrated embodiment, a downward spring force is first applied onto the upper surfaces 50 of the nut portions 44 to cause the threads of the nut portions to disengage the threads of the rod 18 and to cause the nut portions to move downward with respect to the rod until the nut portions are closely above the opening 40 of the stud-connector 32. Then, when the nut portions 44 are closely above the opening 40, the nut portions are compressed radially inward into threaded engagement with the rod 18. Such radially inward compression is preferably achieved by allowing the spring force to push the nut portions 44 downward onto the frustoconical bearing surface 42 of the opening 40 of the stud-connector 32, which in turn causes the surface 42 to apply radially inward reaction forces onto the nut portions. Such radially inward compression of the nut portions 44 is more effectively achieved if one or more of the lower surfaces 48 of the nut portions comprise a circumferential portion of a frustoconical surface that is sized and shaped to substantially mate and conform with the frustoconical bearing surface 42.

Figure 7:
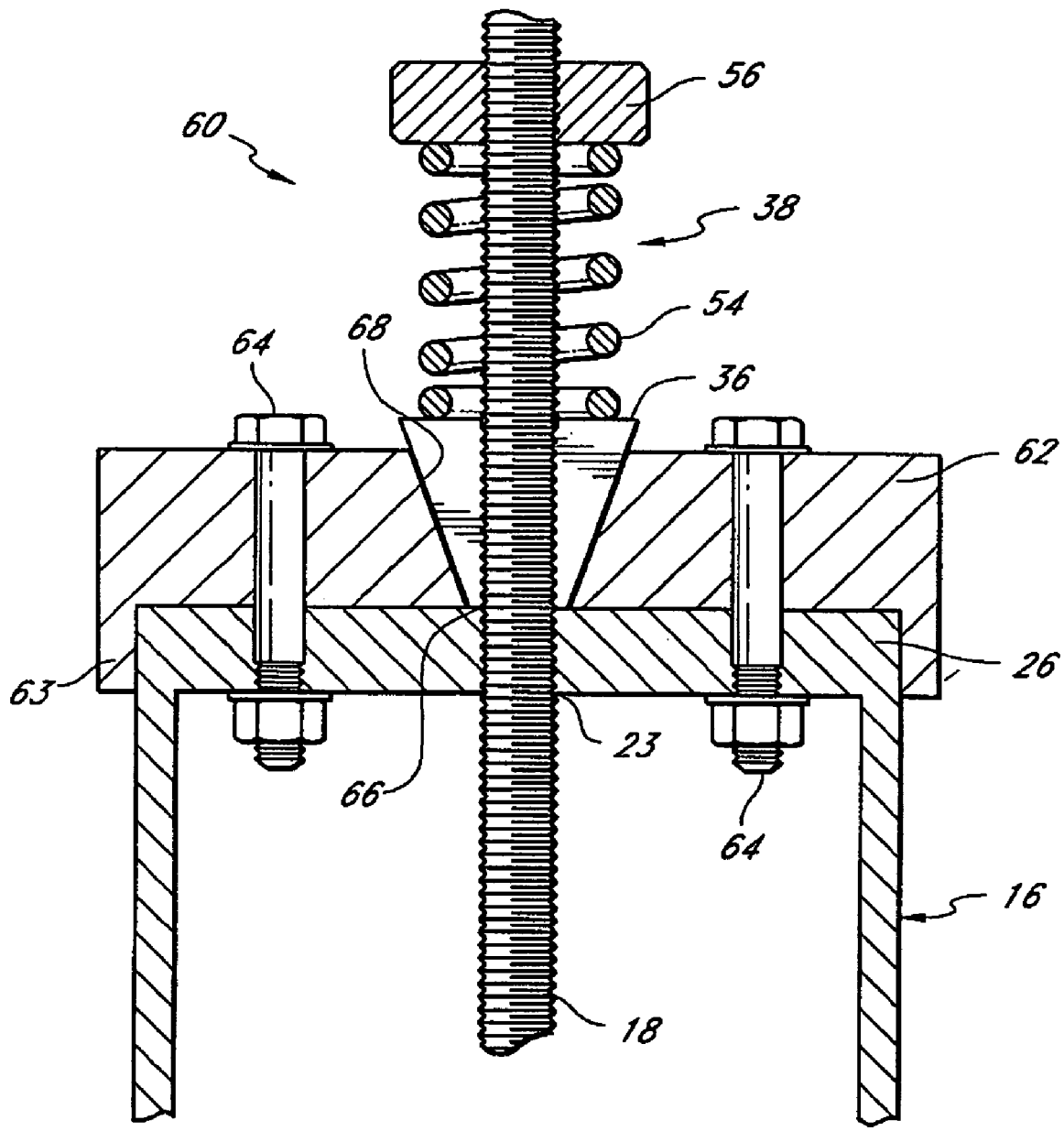
FIG. 7 is a vertical sectional view of an upper portion of a hold-down assembly according to another embodiment of the present invention.

FIG. 7 shows an upper portion of a hold-down assembly 60 according to another embodiment of the present invention. One component of the hold-down assembly 60 is the prior art stud-connector 16 as described above in connection with FIGS. 2A and 2B. As mentioned above, the stud-connector 16 has an upper plate 26 with a hole 23 for receiving a threaded rod 18. The hold-down assembly 60 additionally comprises the rod 18, segmented nut 36, and nut-positioning element 38, substantially as described above in connection with the embodiment of FIGS. 3-6. In the illustrated embodiment, the nut-positioning element 38 comprises a coil spring 54 and a spring-biasing nut 56 as described above in connection with the embodiment of FIG. 3. The hold-down assembly 60 further comprises an end plate 62 adapted to be secured to an end of the stud-connector 16. In the illustrated embodiment, the end plate 62 includes an annular (not necessarily circular) downwardly extending flange 63 adapted to closely receive the upper end of the stud-connector 16. Preferably, the end plate 62 is configured to be selectively attached to and/or detached from the stud-connector 16. In the illustrated embodiment, the end plate 62 is secured to the upper plate 26 of the stud-connector 16 via nut and bolt combinations 64. However, skilled artisans will appreciate that any of a variety of fastening means can be used, such as screws, adhesives, welding, etc. The end plate 62 includes an opening 66 adapted to align with the opening 23 upper plate 26. While the illustrated openings 23 and 66 are roughly of the same size, their sizes can differ without departing from the scope and spirit of this aspect of the invention. The opening 66 defines a frustoconical bearing surface 68 on an upper surface of the end plate 62. The frustoconical bearing surface 68 is substantially similar to the surface 42 described above in connection with FIG. 3.

Thus, the embodiment of FIG. 7 advantageously facilitates the adaptation or retrofitting of an existing stud-connector 16 to be used in conjunction with a segmented nut 36 and nut-positioning element 38 to compensate for downward movement of the stud-connector with respect to the rod 18, substantially as described above in connection with the embodiment of FIG. 3. It is contemplated that one or more of the end plates 62 (and possibly fastening means such as nut and bolt combinations 64), segmented nut 36, and nut-positioning element 38 (e.g., spring 54 and spring-biasing nut 56) can be provided together as a kit.

Figure 8:
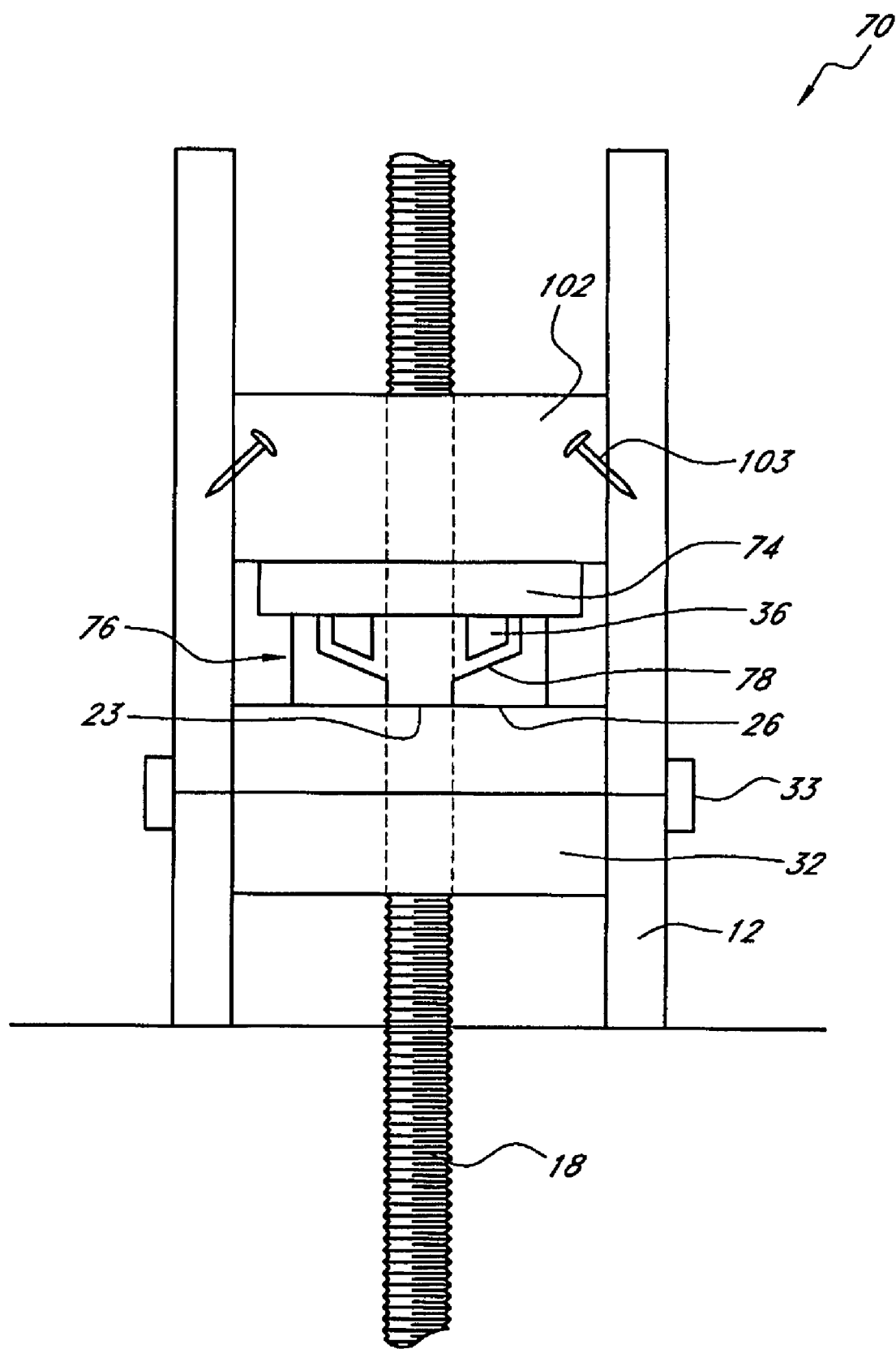
FIG. 8 is a vertical sectional view of a hold-down assembly according to another embodiment of the present invention.

FIG. 8 illustrates a hold-down assembly 70 in a vertical sectional view according to another embodiment of the present invention. FIG. 8, as with the other figures herein, is not necessarily drawn to scale, in order to better illustrate various components of the hold-down assembly 70. One component of the hold-down assembly 70 illustrated here is a stud-connector 32, which is preferably the stud-connector 16 as described above in connection with FIGS. 2A and 2B. In this embodiment, the stud-connector 32 is attached to two generally vertical studs 12 by one or more bolts 33 extending through bolt holes in a "sandwich post" configuration. A "sandwich post" configuration may include two generally vertical studs forming part of a building structure with a stud-connector, for example the stud-connector 32, secured to and interposed between the two generally vertical studs. One example of a "sandwich post" configuration, described in the '767 patent, is a shear wall construction that includes a pair of generally vertical spaced studs and a channel-defining member sandwiched between and attached to both of the studs, the channel-defining member configured to secure a tie member for extending parallel to the studs from the channel-defining member into a vertically-adjacent building structural member, wherein the channel-defining member is attached to the spaced studs via a plurality of bolts passing through each of the spaced studs and the channel-defining member sandwiched therebetween.

Various other fastening means can alternatively be used, giving due consideration to the expected loads in use. The skilled artisan will recognize that the illustrated hold-down assembly 70 may also be readily adapted to be attached to a single generally vertical stud 12, in contrast with the illustrated "sandwich post" embodiment employing two studs 12. As described above, the stud-connector 32 has an upper plate 26 with a hole 23 for receiving a threaded rod 18. The hold-down assembly 70 additionally comprises the rod 18, a rod-gripper 36, gripper support element 76, and one or more gripper-positioning elements 74, 102. A gripper support element 76 in this embodiment comprises a housing body 76. The housing body 76 receives and supports a rod-gripper 36, preferably a segmented nut 36 as described above and shown in FIGS. 4-6. The housing body 76 includes a frustoconical bearing surface 78. An optional housing top 74 sits above the housing body 76. While the housing top 74 may simply rest above the housing body 76, the housing top 74 is preferably attached to the housing body 76 by tack welding, screws, bolts, and the like (not shown).

With continued reference to FIG. 8, there are one or more gripper-positioning elements, which in this embodiment comprise a compression element 102, and optionally a housing top 74. The compression element 102 is preferably attached at 103 to the studs 12, preferably by nails 103, although other attachment techniques such as bolting and the like may also be utilized. In the illustrated embodiment, downward movement of the studs 12, such as by shrinkage due to loss of moisture, causes the compression element 102 to exert a downward force onto the housing top 74. The housing top 74 in turn exerts a downward force on the rod-gripper 36. In the illustrated embodiment, the housing top 74 simply pushes the rod-gripper downward along the rod 18. During the exertion of this downward force, the compression element 102 and the housing top 74 are in a state of compression. If the housing top 74 is omitted, then the compression element 102 exerts the downward force directly onto the rod-gripper 36. A skilled artisan will note that the compression element 102 may also exert the desired downward force if it is alternatively attached to the stud-connector 32 (using bolts or other means of attachment) instead of to the studs 12.

If the studs 12, stud-connector 32, housing body 76, and housing top 74 move upward with respect to the rod 18 and the rod-gripper 36, then the frustoconical bearing surface 78 exerts forces onto the rod-gripper 36 that compress the nut portions 44 of the segmented nut 36 into threaded engagement of the rod 18. This effectively prevents any further upward movement of the studs 12, stud-connector 32, housing body 76, and housing top 74 with respect to the rod 18 and rod-gripper 36.

Figure 9:
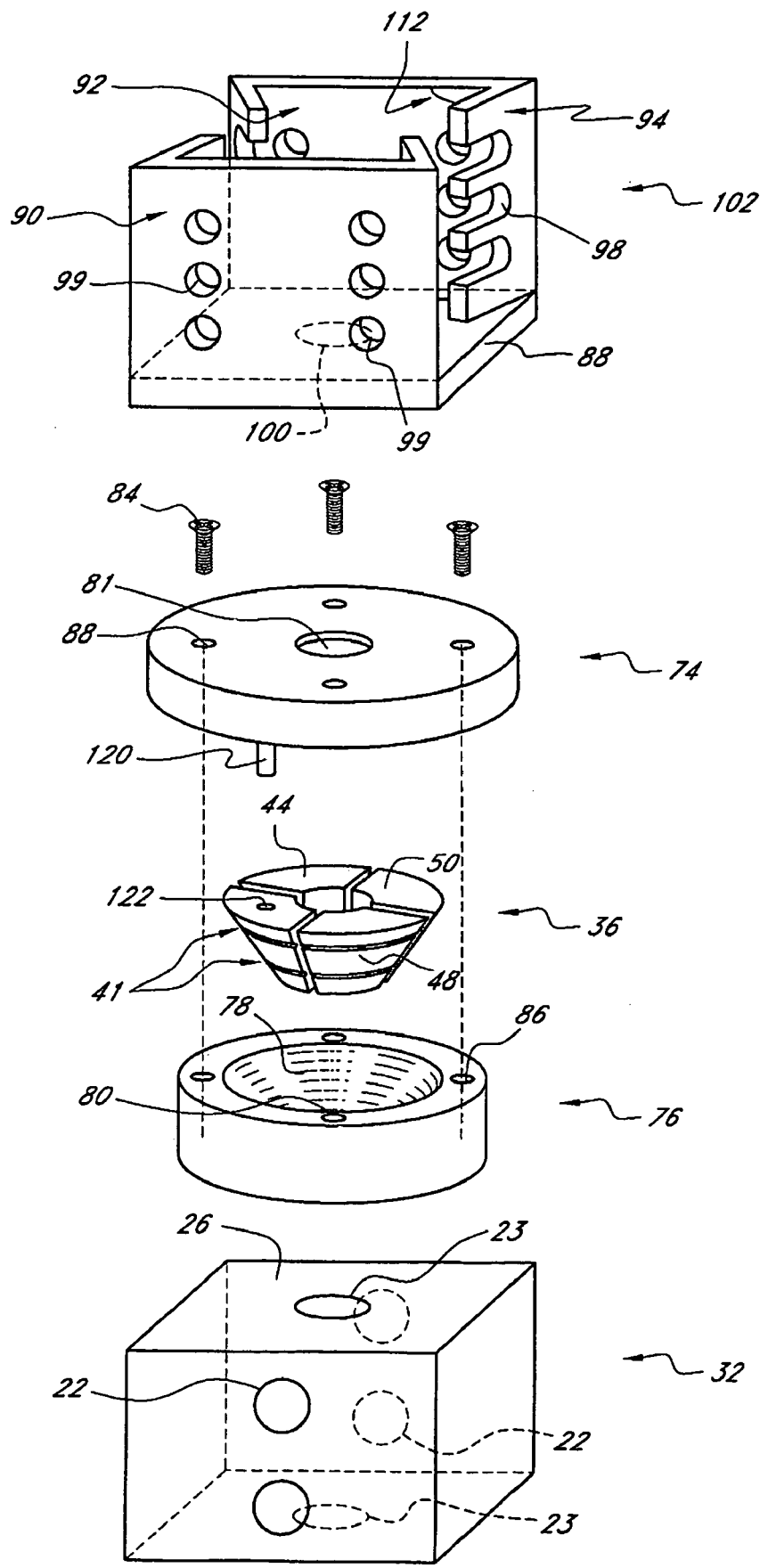
FIG. 9 is an exploded perspective view of the embodiment shown in FIG. 8.

FIG. 9 is an exploded perspective view of the embodiment shown in FIG. 8. FIG. 9 is not drawn to scale, to better show various elements of this embodiment. The compression element 102 preferably comprises a base 88 having a first wall 90 and a second wall 92 at opposite sides of the base 88. The base 88 has a hole 100 configured to receive the threaded rod 18 (shown in FIG. 8). The first wall 90 and second wall 92 each include a plurality of holes 99 that may be utilized for securing (e.g., via nails) the compression element 102 to the vertical studs 12. The compression element 102 may optionally include brackets 94 that are preferably formed integrally with the first 90 and second 92 walls. Each wall 90, 92 preferably has brackets 94 along each of its two vertical edges, as shown. The base 88 and first and second walls 90, 92 of the compression element 102 may also be integrally formed with one another, or alternatively attached together as with the brackets 94 to the first and second walls 90, 92.

The brackets 94 preferably protrude at an acute angle 112 with respect to the respective first 90 or second walls 92. In some embodiments, the brackets 94 facilitate securing of the compression element 102 to the studs 12, such as by nails 103 (FIG. 8) and the like, through holes or more preferably slots 98 of a bracket. Holes 99 of the first and second walls 90, 92 are most preferably displaced lower than the holes or slots 98 to allow for downward orientation of the nails 103 or other securing means. Alternatively, the nails 103 or other securing means may secure the compression element 102 to the studs 12 at an orientation that is non-perpendicular to the surface of the studs 12, but preferably perpendicular to the longitudinal axis of the studs 12 then through holes 99 of the first 90 or second wall 92, and then into the studs 12. This embodiment may be particularly advantageous in providing additional space (by the angled as opposed to perpendicular securement) for an installer to secure the compression element 102 into the studs 12, for example, by guiding nails through the bracket holes 98 at the aforementioned angle 112, then guiding the nails through the holes 99 of the side of which that bracket 94 is directly attached; rather than attaching the compression element 102 by nailing, for example, perpendicularly to the surface of the studs 12, through the holes 99 of the first 90 and/or second 92 walls alone. This perpendicular securing approach, while possible, may be more difficult for an installer due to the limited space available between the two generally vertical studs 12 in this embodiment.

Below the compression element 102 is shown the housing top 74 which includes a generally central hole 81 configured to receive the threaded rod 18. Shown in this embodiment are screws 84 that may extend through holes 88 of the housing top 74 into preferably threaded holes 86 of the housing body 76 in order to attach the housing body 74 to the housing top 76. As noted above, the housing body 74 may alternatively be attached to the housing top 76 using bolts, welding, adhesives, and other suitable means. Alternatively or additionally, the housing top 76 can be fastened to the stud-connector 32. Below the housing top 74 is the segmented nut 36 as described above in FIGS. 4-6. The segmented nut 36, which comprises an upper surface 50 and a lower surface 48, four nut portions 44, and optional grooves 41 configured to receive band elements 43 (shown in FIG. 4), in turn resides in the housing body 76, which has a frustoconical surface 78 and a hole 80 configured to receive the threaded rod 18. In some embodiments (shown in FIG. 9 but not shown in FIG. 8), the upper surfaces 50 of the nut portions 44 may optionally include one or more holes 122 configured to receive one or more pin elements 120 that extend downward from the housing top 74. When the hold-down assembly needs to be disassembled, it may be desirable to move the segmented nut 36 upward along the threaded rod 18, away from the housing body 76. This can be achieved by rotating the housing top 74 in an appropriate direction along a threaded rod 18 while the pin element 120 is inserted into the hole 122, which in turn rotates the threadably engaged segmented nut 36 upwardly along the rod 18. Without this "pin element-hole" feature, it may be difficult to extract the segmented nut 36 from within the housing body 76. Other embodiments described herein may also incorporate this pin element-hole feature as well to more efficiently disassemble a hold-down assembly. Next shown schematically in generally cubical form is a stud-connector 32 that is preferably as described above in connection with FIGS. 2A and 2B, although a skilled artisan will recognize that other stud-connectors may be readily utilized as well, such as described in the '181 and '767 patents. As mentioned above, the stud-connector 32 has an upper plate 26 with a hole 23 for receiving a threaded rod, as well as bolt holes 22 in which bolts may be placed to connect the stud-connector 32 to at least one stud 12.

Figure 10A:
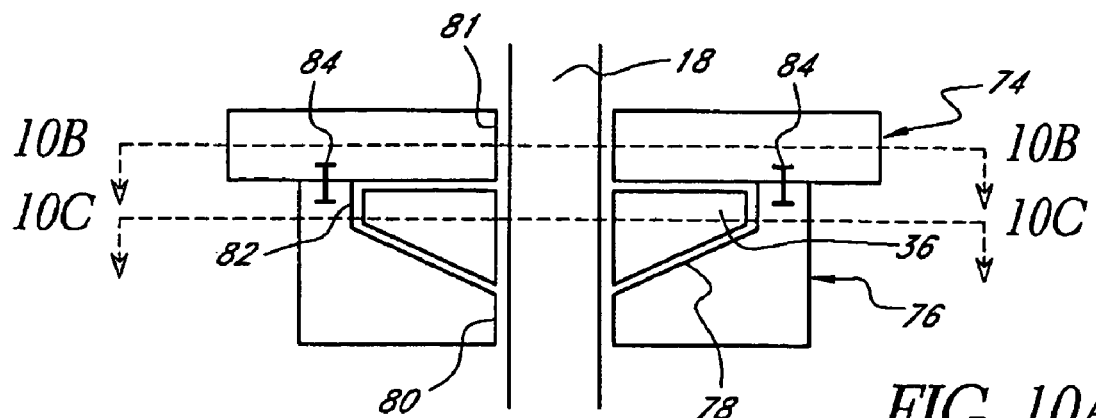
FIG. 10A is a close-up sectional view of the housing body, housing top, segmented nut, and rod of FIGS. 8-9.

FIG. 10A is a vertical sectional view of the housing body 76, housing top 74, segmented nut 36, and rod 18 shown in FIGS. 8 and 9. Shown is the housing top 74 with a hole 81 for receiving the threaded rod 18. The housing top 74 is preferably attached to the housing body 76 by tack welding or screws 84 (shown schematically here) although other means of attachment can readily be used as described above. Within the housing body 76 is the segmented nut 36 as previously described, resting just above the frustoconical bearing surface 78 of the housing body 76. The housing body 76 has a hole 80 configured to receive the threaded rod 18.

Figure 10B:
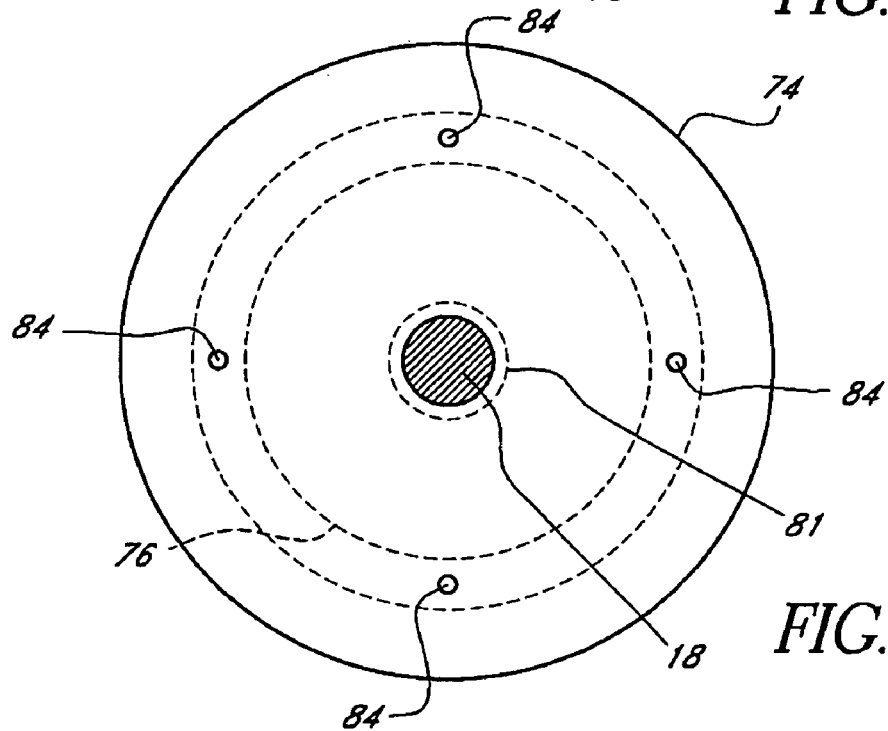
FIG. 10B is a horizontal sectional view taken along line 10B of FIG. 10A.

FIG. 10B is a horizontal cross-sectional view taken along line 10B-10B of FIG. 10A. Shown here is the housing top 74 above the housing body 76 (illustrated as a dotted line) with a hole 81 for receiving the threaded rod 18. Also shown are the screws 84 that attach the housing top 74 to the housing body 76.

Figure 10C:
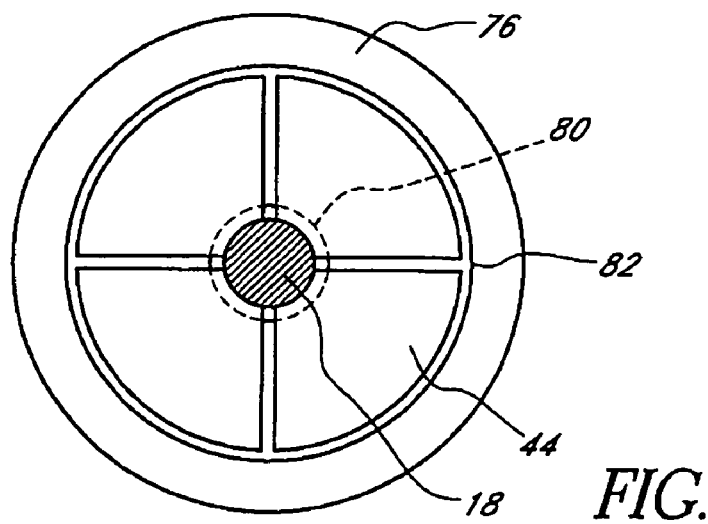
FIG. 10C is a horizontal sectional view taken along line 10C of FIG. 10A.

FIG. 10C is a horizontal cross-sectional view taken along line 10C-10C of FIG. 10A. The housing body 76 has an inner annular surface 82 above and circumscribing the frustoconical surface 78. The housing body 76 and nut 36 can be sized to provide a small annular gap between the nut 36 and annular surface 82. As noted above, the segmented nut 36 may have two, three, four, or more segments 44. The hole 80 of the housing body 76 is shown as a dotted line.

Figure 11:
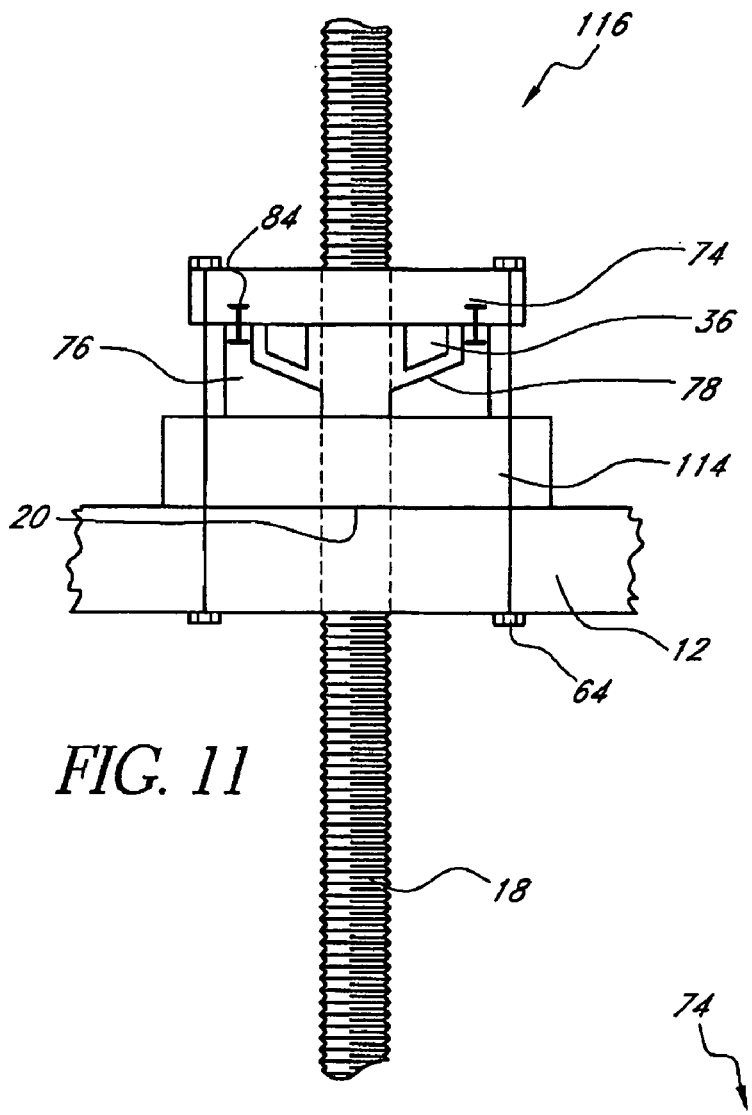
FIG. 11 is a vertical sectional view of another embodiment of a hold-down assembly, according to some embodiments of the invention.

FIG. 11 illustrates a sectional view of another hold-down assembly 116, according to some embodiments of the invention. In this embodiment, there is a plate 130 that is preferably generally horizontal, such as a floor-board, chord, and the like. Also shown is a plate-connector 114. In this embodiment, the plate-connector 114 is preferably a generally horizontal plate. The plate-connector 114 is preferably made out of metal, such as steel, to assist in inhibiting movement of the plate 130, although other materials of similar mass and density may be used for this purpose as well.

The plate-connector 114 may be attached to the plate 130 by bolts, screws, or other suitable attachment means. In other embodiments, however, the plate-connector 114 simply rests above the plate 130 without being fastened thereto. The housing body 76 and housing top 74 are generally as described above and shown in FIGS. 9-10. However, in this embodiment, the housing top 74 is preferably attached not only to the housing body 76 (e.g., by screws 84), but also to the plate 130, or just to the plate-connector 114 in other embodiments such as by bolts 64 or other suitable attachment means. Screws 84 and bolts 64 are shown schematically in this diagram. Thus, in this embodiment, the housing top 74 serves as the sole gripper-positioning element in the following manner.

Suppose that the plate 130 and plate-connector 114 descend relative to the rod 18. This can occur due to shrinkage of the plate 130 or of building elements below the plate 130 (if the plate 130 is elevated with respect to the building foundation). As the plate-connector 114 moves downward with respect to the rod 18, the housing top 74 exerts downward force onto the top surfaces 50 of the nut portions 44 (shown in FIG. 9 above) of the segmented nut 36. This pushes the nut portions 44 down somewhat relative to the rod 18. In the event of an upward movement of the plate 130, plate-connector 114, housing body 76, and housing top 74 with respect to the rod 18, the lower surfaces 48 of the nut portions 44 bear against the frustoconical bearing surface 78 of the housing body 76. This causes the surface 78 to exert forces onto the nut portions 44, whose radial components push the nut portions 44 radially inward into the rod 18. This causes the nut portions 44 to grip onto the threads of the rod 18, which resists vertical movement of the segmented nut 36 with respect to the rod 18. This also resists further upward movement of the plate 130, plate-connector 114, housing body 76, and housing top 74 with respect to the rod 18. Over time, the plate 130 and plate-connector 114 may continue to move downward with respect to the rod 18 due to the shrinkage of wooden members of the building. This again causes the housing top 74 to push the segmented nut 36 downward (with respect to the rod 18) with the plate-connector 114 and housing body 76. In this manner, the hold-down assembly 116 of FIG. 11 compensates for the shrinkage of building elements.

Thus it can be seen that upward movement of the plate 130 and plate-connector 114 with respect to the rod 18, due to an earthquake or other forces, will cause the frustoconical bearing surface 78 of the housing body 76 to exert radially inward forces onto the nut portions 44, which in turn causes the threads of the nut portions 44 to engage the threads of the rod 18. As a consequence, the segmented nut 36 and stud-connector 114 are substantially prevented from moving upward relative to the rod 18. It can also be seen that downward movement of the plate 130 and plate-connector 114 with respect to the rod 18 (due to shrinkage of building elements) causes the housing top 74 to push the segmented nut 36 downward relative to the rod 18, wherein the threads of the nut portions 44 disengage from the threads of the rod 18. This in turn causes the segmented nut 36 to move downward along the rod 18.

Figure 11A:
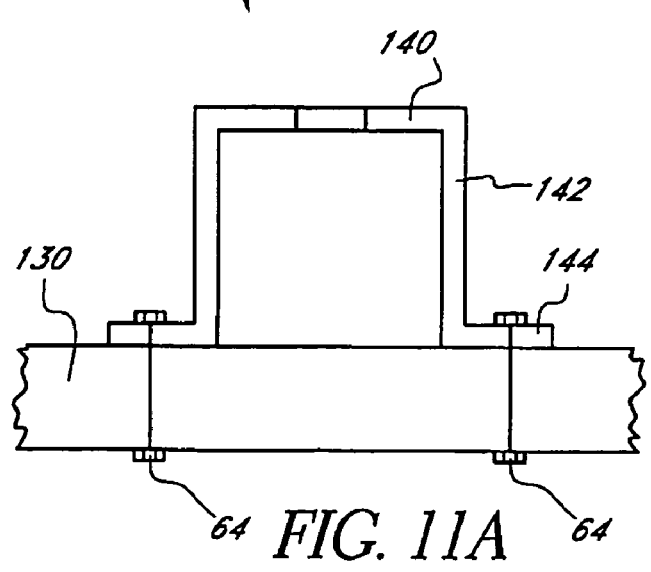
FIG. 11A is a schematic of another embodiment of a gripper-positioning element.

FIG. 11A is a schematic of another embodiment of a housing top 74. Here, only the housing top 74 and plate 130 are shown for simplicity of illustration; all other elements have been omitted from the drawing but not necessarily the assembly. Here, the housing top 74 has a generally horizontal central upper portion 140 similar to the housing top 74 of FIG. 11. The housing top 74 in this embodiment, however, further includes a tubular (not necessarily cylindrical) portion 142 extending downward from the central upper portion 140. The tubular portion 142 is preferably substantially vertical. Furthermore, the illustrated housing top includes, at the bottom of the tubular portion 142, an annular horizontal flange 144 resting on either a plate 130 or plate-connector 114 (not shown in FIG. 11A, but preferably as shown in FIG. 11). The housing top 74 may be attached, by bolts 64 or other means, to the plate 130, plate-connector 114, or both. Thus, it can be appreciated that as the plate 130 moves downward with respect to the rod 18, the housing top 74 in this configuration (which resembles a "top hat") also exerts downward force onto the top surfaces 50 of the nut portions 44 (shown in FIG. 9 above) of the segmented nut 36, pushing the nut 36 downward along the rod 18.

Figure 12:
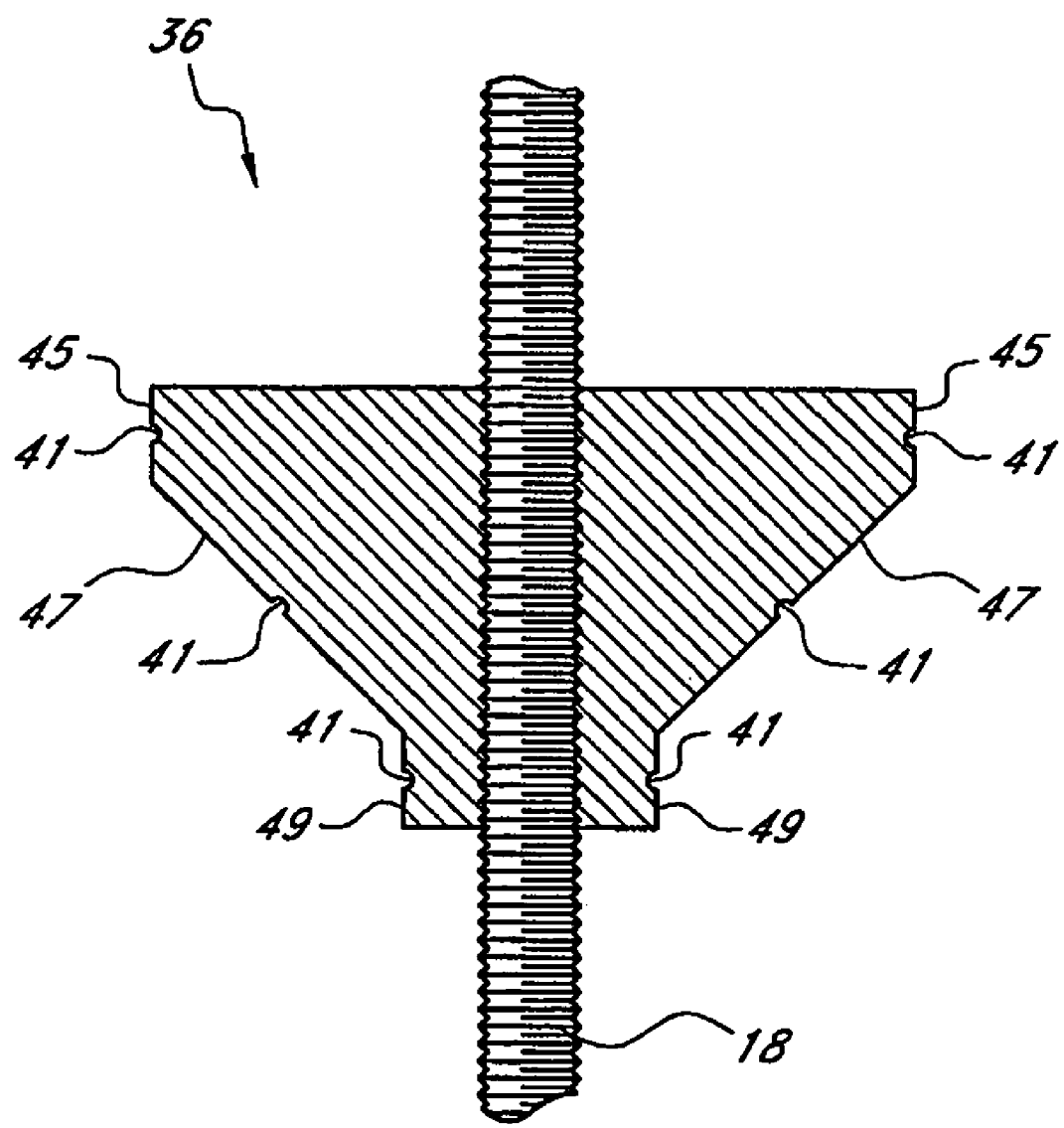
FIG. 12 is a vertical sectional view of another embodiment of a segmented nut.

FIG. 12 shows a vertical sectional view of a rod-gripper 36, according to another embodiment of the invention. In side profile, the rod-gripper 36 has a generally vertical upper surface 45, a frustoconical middle surface 47, and a generally vertical lower surface 49 that are all configured to interact with complementary portions of a gripper support element 76. The rod-gripper 36 may have one or more grooves 41 within the surfaces 45, 47, and/or 49 to accommodate a band element 43 as previously described. The frustoconical middle surface 47 of the rod-gripper 36 is at an angle 118 to horizontal, which is preferably 50 to 60 degrees, and more preferably about 55.5 degrees. Such a preferred angle 118 will most optimally allow the frustoconical bearing surface 78 (which can have about the same angle to horizontal as the frustoconical middle surface 47 of the rod-gripper 36) of a gripper support element 76 to exert radially inward forces onto the nut portions 44, which in turn causes the threads of the nut portions 44 to engage the threads of the rod 18. As a consequence, the segmented nut 36 and stud-connector 114 are more optimally substantially prevented from moving upward relative to the rod 18.

A skilled artisan will note that the invention can be readily adapted to uses other than holding down a building construction. For example, the various hold-down assemblies shown herein can be configured to stabilize various parts within an automobile, airplane, or other machine equipment where vibratory forces may cause undesirable "slop" of various components with respect to a stabilizing element of the structure, such as a frame. For example, vibratory forces caused by driving over potholes and uneven surfaces may cause "slop" between engine components and the chassis of an automobile. This may potentially lead to damage to these components as they may loosen or "bump up" against each other. In these applications, the orientation of various members (analogous to the above described studs and plates) need not necessarily be substantially vertical or horizontal as described above (with respect to a stable building element or main structural member). However, they may be oriented substantially parallel or perpendicular to an axis of a rod used similarly to the rod 18 described above.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications thereof. Thus, it is intended that the scope of the present invention herein disclosed should not be limited by the particular disclosed embodiments described above, but should be determined only by a fair reading of the claims that follow.

What is claimed is:
1. A method of holding down a building construction, comprising:
  providing a generally vertical rod generally parallel to a first generally vertical stud of a building structure;
  securing a lower portion of the rod to a stable building element configured to have a substantially constant vertical position during downward settling of elements of the building structure;
  providing a stud-connector having an opening configured to receive the rod;
  engaging the stud-connector with the rod so that the rod is received within the opening of the stud-connector;
  securing the stud-connector with respect to the first stud;
  providing a gripper support element that is separate and unsecured with respect to the stud-connector, the gripper support element having an opening configured to receive the rod;
  engaging the gripper support element with the rod so that the rod is received within the opening of the gripper support element;
  engaging a rod-gripping member onto the rod closely above the opening of the gripper support element, the rod-gripping member comprising a plurality of gripping portions generally surrounding the rod, each of the gripping portions having a rod-engagement surface with teeth configured to engage circumferential teeth of a circumferential portion of the rod, the gripping portions being sized so that when they are compressed radially inward into toothed engagement with the rod the rod-gripping member and rod have a horizontal cross section that is too large to pass downward through the opening of the gripper support element;
  configuring an assembly of the rod, stud-connector, stud, gripper support element, and rod-gripping member so that the assembly reacts to an upward movement of the stud, stud-connector, and gripper support element with respect to the rod and rod-gripping member by compressing the gripping portions radially inward into toothed engagement with the rod closely above the opening of the gripper support element, so that the rod-gripping member substantially impedes the upward movement of the stud, stud-connector, and gripper support element relative to the rod; and
  configuring the assembly to react to a downward movement of the stud, stud-connector, and gripper support element with respect to the rod and rod-gripping member by moving the rod-gripping member downward along the rod, wherein moving the rod-gripping member downward along the rod comprises pushing the rod-gripping member downward with a gripper-positioning element that is secured to the stud at a position above the gripper support element so that the gripper support element is between the gripper-positioning element and the stud-connector, the gripper-positioning element configured to move downward relative to the rod during said downward settling of elements of the building structure;
  wherein the gripper-positioning element comprises:
    a generally horizontal base having a hole configured to receive the rod;
    a first generally vertical wall extending upward from a side edge of the base; and
    a second generally vertical wall extending upward from an opposite side edge of the base;

wherein each of the walls includes one or more holes for receiving securing members for securing the gripper-positioning element to either the stud or to a second generally vertical stud forming part of the building structure.

2. The method of claim 1, further comprising providing a second generally vertical stud forming part of a building structure, and securing the stud-connector to the second stud so that the stud-connector is sandwiched between the first and second studs.

3. The method of claim 1, wherein the rod is threaded and the circumferential teeth of the rod comprise threads adapted to receive a nut, the gripping portions comprising a plurality of nut portions forming a segmented nut, the teeth of the gripping portions comprising threads configured to engage the threads of the rod.

4. The method of claim 1, wherein moving the rod-gripping member downward along the rod comprises:
exerting a downward force onto upper surfaces of the gripping portions to move the gripping portions radially outward from the rod and to disengage the teeth of the gripping portions from the circumferential teeth of the rod;
while the teeth of the rod and the gripping portions are disengaged, moving the gripping portions downward with respect to the rod a distance substantially equal to the downward movement of the stud, stud-connector, and gripper support element with respect to the rod; and
after moving the gripping portions downward, compressing the gripping portions radially inward into toothed engagement with the rod.

5. The method of claim 1, wherein the gripper-positioning element further comprises generally vertical brackets extending from vertical edges of the walls at acute angles with respect to the walls, said brackets including holes for receiving the securing members.

6. The method of claim 1, wherein compressing the gripping portions radially inward into toothed engagement with the rod comprises allowing a frustoconical bearing surface of the opening of the gripper support element to move upward against the gripping portions and exert radially inwardly directed forces onto the gripping portions.

7. The method of claim 6, wherein each of the gripping portions has a lower bearing surface that substantially conforms with a circumferential portion of the frustoconical bearing surface.

8. A method of holding down a building construction, comprising:
providing a generally vertical rod generally perpendicular to a generally horizontal plate of a building structure;
securing a lower portion of the rod to a stable building element configured to have a substantially constant vertical position during downward settling of elements of the building structure;
providing a plate-connector having an opening configured to receive the rod;
resting said plate connector above an upper surface of the horizontal plate;
engaging the plate-connector with the rod so that the rod is received within the opening of the plate-connector;
providing a gripper support element having an opening configured to receive the rod;
engaging the gripper support element with the rod so that the rod is received within the opening of the gripper support element;
coupling the gripper support element with respect to the horizontal plate using substantially vertical bolts positioned radially outward of a perimeter of the gripper support element, so that the gripper support element is substantially vertically fixed with respect to the horizontal plate;
engaging a rod-gripping member onto the rod closely above the opening of the gripper support element, the rod-gripping member comprising a plurality of gripping portions generally surrounding the rod, each of the gripping portions having a rod-engagement surface with teeth configured to engage circumferential teeth of a circumferential portion of the rod, the gripping portions being sized so that when they are compressed radially inward into toothed engagement with the rod the rod-gripping member and rod have a horizontal cross section that is too large to pass downward through the opening of the gripper support element; and
configuring an assembly of the rod, plate-connector, horizontal plate, gripper support element, and rod-gripping member so that the assembly reacts to an upward movement of the plate, plate-connector, and gripper support element with respect to the rod and rod-gripping member by compressing the gripping portions radially inward into toothed engagement with the rod closely above the opening of the gripper support element.

9. The method of claim 8, further comprising securing the plate-connector to the plate.

10. The method of claim 8, wherein the rod is threaded and the circumferential teeth of the rod comprise threads adapted to receive a nut, the gripping portions comprising a plurality of nut portions forming a segmented nut, the teeth of the gripping portions comprising threads configured to engage the threads of the rod.

11. The method of claim 8, further comprising:
configuring the assembly to react to a downward movement of the plate, plate-connector, and gripper support element with respect to the rod and rod-gripping member by moving the rod-gripping member downward along the rod.

12. The method of claim 11, wherein moving the rod-gripping member downward along the rod comprises:
applying a downward force onto upper surfaces of the gripping portions to cause the teeth of the gripping portions to disengage the teeth of the rod;
while the teeth of the rod and the gripping portions are disengaged, moving the gripping portions downward with respect to the rod a distance substantially equal to the downward movement of the plate, plate-connector, and gripper support element with respect to the rod; and
after moving the gripping portions downward, compressing the gripping portions radially inward into toothed engagement with the rod.

13. The method of claim 11, wherein moving the rod-gripping member downward along the rod comprises pushing the gripping portions downward with a gripper-positioning element that is secured to the horizontal plate by said vertical bolts and positioned above the gripper support element so that the gripper support element is between the gripper-positioning element and the horizontal plate, the gripper-positioning element configured to move downward relative to the rod during said downward movement of the plate, plate-connector, and gripper support element.

14. The method of claim 8, wherein compressing the gripping portions radially inward into toothed engagement with the rod comprises allowing a frustoconical bearing surface of the opening of the gripper support element to move upward against the gripping portions and exert radially inwardly directed forces onto the gripping portions.

15. The method of claim 14, wherein each of the gripping portions has a lower bearing surface that substantially conforms with a circumferential portion of the frustoconical bearing surface.

* * * * *